UNITED STATES PATENT OFFICE.

WILLIS H. POST, OF BATTLE CREEK, MICHIGAN, ASSIGNOR TO POSTUM CEREAL CO., LIMITED, OF BATTLE CREEK, MICHIGAN, A PARTNERSHIP ASSOCIATION, LIMITED, UNDER THE LAWS OF MICHIGAN.

BEVERAGE EXTRACT.

1,098,683.  Specification of Letters Patent.  Patented June 2, 1914.

No Drawing.  Application filed February 7, 1913.  Serial No. 746,940.

*To all whom it may concern:*

Be it known that I, WILLIS H. POST, of Battle Creek, Michigan, have invented a new and useful Improvement in Beverage Extracts, which invention is fully set forth in the following specification.

This invention relates to beverage extracts and has for its object to provide a solid soluble extract from roasted potatoes and a caramelized saccharine body, said extract being adapted for the preparation of a beverage which is palatable and nutritious and may be used as a substitute for coffee.

Potatoes, as is well known, contain starch which during the cooking operations usually practised to render them suitable for food is converted into a soluble form by the action of moisture and heat. I have discovered that by first drying the potatoes to remove moisture and then roasting the same with a saccharine body, a product is obtained from which a soluble solid extract may be prepared which when dissolved in water gives with or without sugar and cream a palatable beverage in lieu of coffee.

For the purpose of this invention, I wash the potatoes either sweet or white potatoes and slice them rather thin without removing the outer skins. For this purpose I prefer sweet potatoes, *Ipomœa Batatas*, because of the sugar they contain, 2 to 3%, their greater yield in starch and of the flavor given to the final product. The sliced potatoes are next subjected to a drying operation in a vacuum chamber. This method of drying has the advantage of excluding oxygen and the effects of oxidation and enabling a low temperature to be used at this stage. The drying operation may, however, be conducted with exposure to the air where vacuum drying is not readily available. When the moisture which amounts to about 75% of the weight of the potatoes is removed the slices are comminuted to a fairly fine condition and are mixed with about 10% of a saccharine body, such as molasses, syrup or sugar. The mass is then roasted to a medium brown color to render all or a greater part of the starch soluble and to caramelize the sugar contents. The roasted product is treated with water, the temperature of which is about 95° C., the extract is filtered to render it clear and evaporated *in vacuo*. The dry extract in comminuted form is ready to be placed in containers.

Instead of mixing the dried slices with molasses and roasting, the two materials may be separately subjected to heat and mixed together before extracting. I prefer, however, to mix before roasting.

The product is very soluble in both hot and cold water. A teaspoonful of the extract dissolves in a cup of hot water in less than a minute and gives a pleasant beverage which may be served with or without cream and sugar.

What is claimed is:—

1. A solid soluble extract for preparing beverages, consisting of extractive matter of sweet potatoes and added saccharine material roasted to caramelize the sugar present.

2. A solid soluble extract for preparing beverages, consisting of comminuted extractive matter in soluble form of sweet potatoes and molasses roasted to caramelize the sugar present.

3. A solid soluble extract for preparing beverages, consisting of extractive matter in soluble form of roasted sweet potatoes and caramelized molasses.

In testimony whereof I have signed this specification in the presence of two subscribing witnesses.

WILLIS H. POST.

Witnesses:
G. M. LA PIERIE,
VERN D. SUTTON.